USOO5811146A

United States Patent [19]
Marra et al.

[11] Patent Number: 5,811,146
[45] Date of Patent: Sep. 22, 1998

[54] METHOD FOR PRODUCING FLAT PROCESSED MEAT PRODUCTS

[75] Inventors: Jerome F. Marra, Middleton; Vernon D. Karman, Poynette, both of Wis.

[73] Assignee: Kraft Foods, Inc., Northfield, Ill.

[21] Appl. No.: 584,905

[22] Filed: Jan. 11, 1996

[51] Int. Cl.⁶ ................................................. A23L 1/00
[52] U.S. Cl. .......................... 426/513; 426/523; 426/646
[58] Field of Search ................................. 426/513, 646, 426/315, 523

[56] References Cited

U.S. PATENT DOCUMENTS

| | | | |
|---|---|---|---|
| 2,507,486 | 5/1950 | Weissenbach | 426/646 |
| 2,786,764 | 3/1957 | Rivoche | 426/513 |
| 3,011,895 | 12/1961 | Toepper et al. | 426/513 |
| 3,642,496 | 2/1972 | Gibson | 426/513 |
| 3,971,851 | 7/1976 | Otto | 426/646 |
| 4,138,768 | 2/1979 | Roth | 425/404 |
| 4,163,804 | 8/1979 | Meter et al. | 426/513 |
| 4,192,899 | 3/1980 | Roth | 426/513 |
| 4,349,575 | 9/1982 | Roth | 426/513 |
| 4,446,159 | 5/1984 | Roth | 426/513 |
| 4,448,793 | 5/1984 | Akesson | 426/513 |
| 4,559,236 | 12/1985 | Okada | 426/513 |
| 4,680,183 | 7/1987 | van Schouwenburg | 426/646 |
| 4,905,587 | 3/1990 | Smithers | 99/534 |
| 4,975,291 | 12/1990 | Petrosillo | 426/513 |
| 5,037,350 | 8/1991 | Richardson et al. | 426/518 |
| 5,132,137 | 7/1992 | Reimann et al. | 426/513 |

*Primary Examiner*—George Yeung
*Attorney, Agent, or Firm*—Lockwood, Alex, Fitzgibbon & Cummings

[57] ABSTRACT

Methods are disclosed for producing substantially flat processed meat products and, more specifically, flat casingless hot dogs. In the disclosed methods a material containing substantial amounts of the meat protein is formed prior to cooking into a flat form of a predetermined thickness by pressing the uncooked material. The flat form is then heated either simultaneously with the forming or thereafter to a temperature and for a time sufficient to congeal a sufficient amount of the protein to stabilize the shape of the flat form but insufficient to cause any substantial rendering of the material. The surface of the congealed flat form is then treated by smoke, drying or both to establish its texture and flavor, and the treated flat form is then finally cooked into the food product. The flat form is cut into discrete flat shaped patties either at the beginning of the method or subsequent to cooking or chilling. The meat product formed by the method of the invention has a unique layered cross-section, and pleasantly pocked surface appearance, color and texture.

41 Claims, 2 Drawing Sheets

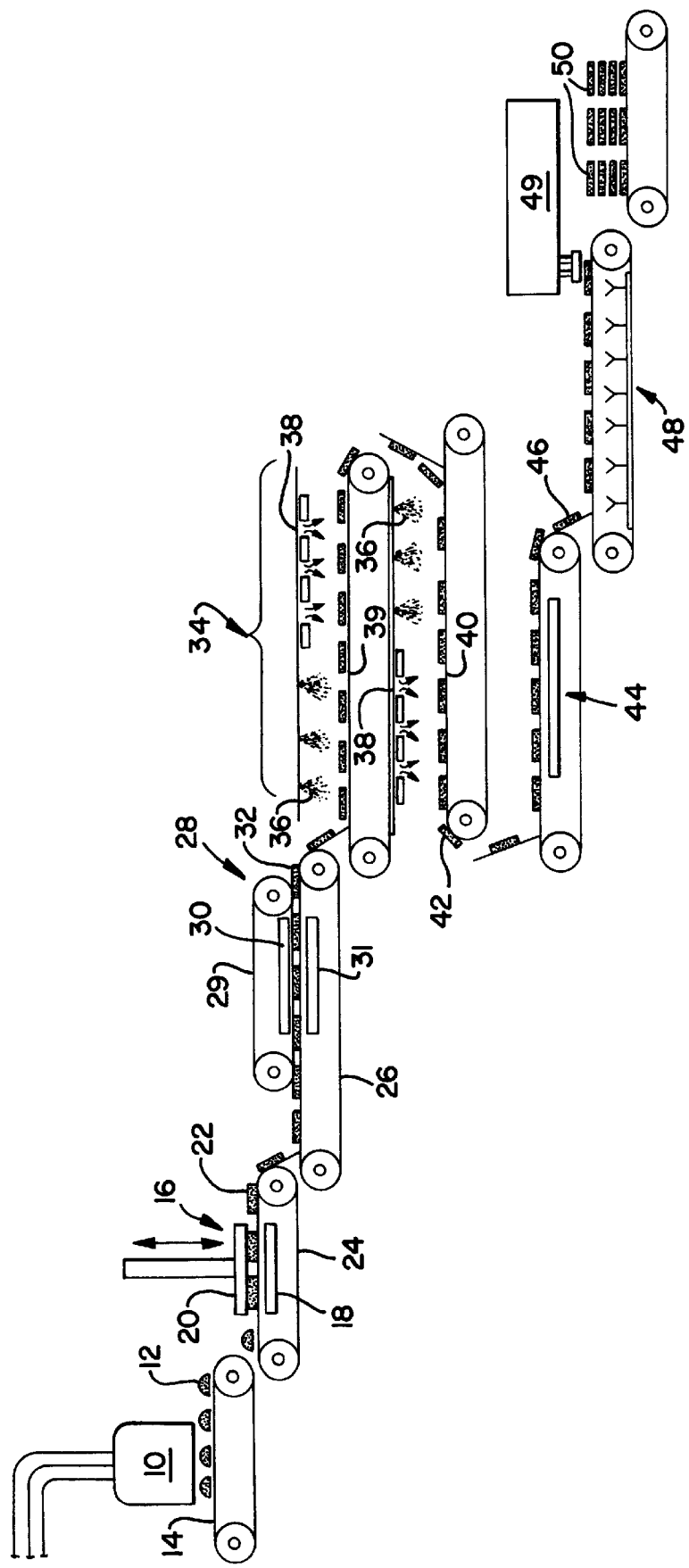

METHOD FOR PRODUCING FLAT PROCESSED MEAT PRODUCTS

BACKGROUND AND SUMMARY OF THE INVENTION

The present invention is directed to a method for producing substantially flat processed meat products and, more particularly, to a method for producing a flat casingless wiener, frankfurter or hot dog.

Many sausage products, and in particular wieners or hot dogs, are produced in a generally cylindrical form in which a meat emulsion is injected into some form of either a natural or synthetic tubular casing. Following injection of the essentially raw meat emulsion into such casing, the product is typically further processed and cooked, followed by chilling/freezing and packing. After cooking, the casing may be left on the product or, in the case of most commercially available skinless wieners or hot dogs, the casing is removed prior to packaging. Even though the casing is removed from a wiener, frankfurter or hot dog prior to packaging, the processed meat product retains its generally cylindrical shape which was imparted to it by the casing, because the processing and cooking result in a setting of the emulsion to stabilize its shape. Also a proteinaceous hide or skin is formed on the exterior of the product which further assists in the retention of its cylindrical shape after removal of the casing, and during storage, reheating and consumption by the ultimate consumer.

The terms "wiener", "frankfurter" and "hot dog" as employed hereinafter will have substantially the same meaning.

In certain instances it may be advantageous to change the classic cylindrical shape of such meat products, and particularly the classic shape of wieners, to an essentially flat patty shape. For example, flat shapes may be more advantageously finally prepared for consumption on a flat surface or grill, such as might typically be found in fast service restaurants which serve hamburgers. Such flat shapes may also be more advantageously prepared for final consumption in a flat frying pan or on a griddle. Such flat patty shapes may also be desirable where the meat product is to be combined for final consumption with other flat ingredients, such as cheese slices, and/or in a sandwich formed of flat bread slices.

Such flat shapes also advantageously result in reduced processing times for cooking and/or chilling/freezing relative to the comparable cylindrical shapes, and the equipment used to produce them may be more compact and less capital intensive. This is because flat patties have lesser thicknesses and larger surface areas than the comparable cylindrical shapes.

Moreover, it may be advantageous from a cost and handling standpoint to eliminate the need for the casings as are typically needed in the production of cylindrically shaped products.

Accordingly, the present invention is directed to methods of producing a substantially flat meat product and, more particularly, a substantially flat wiener or hot dog which may be more advantageously cooked or reheated on a flat heating surface. The flat meat product which is formed by the methods of the present invention has a unique layered texture and an attractive semi-rough, flat and pock marked surface similar in some respects to that of a hamburger, has a firm bite and juicy mouthfeel, and in the case of a beef wiener, an attractive appetizing pink color. In the methods of the present invention, the product type and shape may be easily changed, the processing time may be substantially reduced relative to the cylindrical counterpart of the same sized product, and the methods are capable of being carried out with more compact and less capital intensive equipment and with a minimum or absence of rework or scrap. In the methods of the present invention the product may also be formed using conventional hot dog emulsified batters or other conventional sausage starting mixes. Moreover, the meat product which may be formed by the methods of the present invention is formed without the use of casings which further reduces the cost and complexity of production. Still another advantage of the methods of the present invention is that they are capable of continuous production of meat product and continuous quality control monitoring of important product characteristics such as color and texture.

In one principal aspect of the present invention, a method of producing a substantially flat food product from a material containing substantial amounts of protein of an animal origin comprises forming the material prior to cooking into a flat form of a predetermined thickness and heating the flat form to a temperature and for a time sufficient to congeal a sufficient amount of the protein to stabilize the flat form, but insufficient to cause any substantial rendering of the material. The surface of the congealed flat form is then treated to establish its texture and flavor, and the treated flat form is cooked into the food product.

In another principal aspect of the present invention, the uncooked material which is formed into the flat form is an emulsified batter containing substantial amounts of the protein of animal origin therein, and preferably the protein is of a red meat or poultry origin, still more preferably is primarily beef, and most preferably is a hot dog batter.

In still another principal aspect of the present invention, the flat form is a sheet and the sheet is divided into a plurality of pieces of flat discrete patty shapes.

In still another principal aspect of the present invention, the aforementioned sheet is divided into a plurality of pieces subsequent to cooking, and more preferably subsequent to chilling.

In still another principal aspect of the present invention, the flat form comprises a plurality of pieces of flat discrete patty shapes prior to cooking.

In still another principal aspect of the present invention, the flat form is heated to at least about 115° F. to congeal the material prior to the surface treatment of the flat form.

In still another principal aspect of the present invention, the treating of the surface of the congealed flat form comprises drying of the surface, the application of a smoke formulation to the surface or both.

In still another principal aspect of the present invention, the treating of the surface denatures the surface to form a hide thereon.

In still another principal aspect of the present invention, the cooking is performed in an oven.

In still another principal aspect of the present invention, the flat form is accomplished by pressing or extruding the uncooked material prior to cooking.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a schematic depiction illustrating one preferred embodiment of method in accordance with the principles of the present invention for the production of a substantially flat food product;

DETAILED DESCRIPTION OF THE PREFERRED EMBODIMENTS

Figure 3:
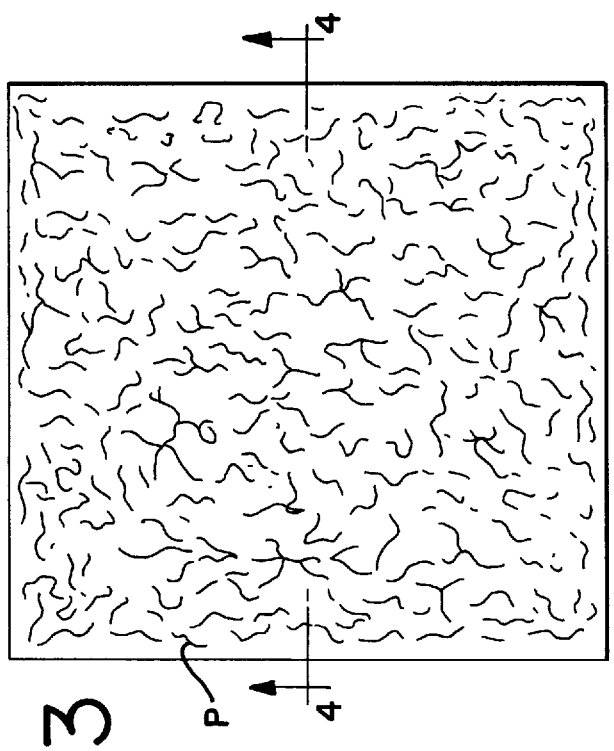
FIG. 3 is a plan view of a substantially flat meat product made in accordance with the present invention.

As previously stated, the present invention is directed to methods for the production of flat food products containing substantial amounts of a protein of an animal origin. These may include for example proteins from poultry meats, such as chicken, turkey or other fowl, from red meats, such as beef, pork, lamb or other such animal meats, or combinations thereof. In a particularly preferred form, the methods of the invention are for the production of a substantially flat wiener or hot dog product from a conventional hot dog meat emulsion.

One preferred embodiment of method of the invention is shown in FIG. 1. In the method shown in FIG. 1, a previously formulated finely divided meat mixture, such as a meat emulsion batter, is pumped to a machine 10 typically used in the meat industry to form patties or nuggets from meat emulsions. These patties 12 preferably are deposited on a moving belt 14. The weight of each patty 12 represents the finished product weight plus an allowance for any process weight loss or shrinkage that may occur.

The depositing step just described could be used to directly form the shape of the patty which then is to be further processed. In the alternative a press 16 common in the food industry might be employed to form the flat dimension thickness of the meat patty, as shown in FIG. 1. Such press 16 typically comprises a pair of heated platens 18 and 20, one stationary platen 18 and one moving platen 20, the latter of which moves as shown by the arrow in FIG. 1 to press and flatten the patty 12 into the desired thickness. The upper platen 20 may also contain cavities to establish the shape of the patty 22, if desired. The heat provided by the platens preferably has two functions. First, a thin skin of denatured protein begins to be formed on the patty 22 which acts as a protective layer for the patty and contains the patty's shape. Second, a small amount of grease is produced from the melted fat in the meat emulsion which acts as a natural release agent and keeps the patty 22 from sticking to the belt 24 and upper platen 20.

The formed patty 22 is then preferably transferred to a second belt 26 where it passes through a piece of equipment 28 to further heat the patty and finish congealing of the protein in the patty. This equipment preferably includes a second upper belt 29 and upper and lower heating elements 30 and 31 to simultaneously heat both sides of the patty 22 through the upper and lower belts. The belts 26 and 29 may be formed of a metal, such as stainless steel which readily conducts heat from the heating elements through the belts to the patties 22 as they pass between the belts. In the alternative, the belts 26 and 29 may be formed of a suitable polymeric material, such as Teflon. The heating elements 30 and 31 may be heated by any suitable means, such as electricity or a hot fluid, such as oil or water.

The heating elements 30 and 31 should be maintained at a temperature sufficient to congeal the protein in the patty 22 by the time it leaves the equipment 28. A suitable temperature for the elements is about 125°–135° F. The residence time in the equipment 28 is controlled by the length and speed of the belts 26 and 29 and is adjusted such that a shape-stable patty 32 is provided at the conclusion of heating in the equipment 28. It has been found that a temperature of at least about 115° F. of the meat will result in the desired congealing and formation of a shape-stable product, but without any substantial cooking or rendering of the patty. Where the congealed patty 32 is formed of an all-beef hot dog emulsion, it is slightly pink when it has been congealed, but not as bright pink as a fully processed hot dog.

It is important in the method of the present invention that only so much heat has been applied to the patty 32 at this point in the process so that its outer surfaces have congealed to a shape-stable form, but that no substantial degree of rendering has occurred. Any appreciable degree of rendering will result in a mess, a loss of yield and a reduction in quality of the finished product because the material both at this point as well as the finished product is not contained or confined in a casing. Moreover, any appreciable rendering of the patty 32 may also adversely affect the uniformity of any further treatment steps as will be discussed to follow.

It is also preferred that the belts 26 and 29 exert some pressure on the patty while it is being congealed. This pressure will result in the product having a somewhat layered texture in cross-section which will result in a pleasant firm bite and juicy mouthfeel in the final product.

The congealed patty 32 is then transferred from the equipment 28 to a piece of equipment 34 in which surface treatment alone or together with the final cooking steps are accomplished. The surface treatment preferably includes the application of one or both smoke and drying to establish an acid denatured hide and color on the patty. Liquid smoke could be sprayed, as shown at 36, and/or brushed onto the surface of the patty. Alternatively, a natural smoke chamber might be employed.

Upon considering the geometry of the patty 32, it will be appreciated that the flat patty has more surface area per unit mass than a cylindrical product of equal weight, such as a typical cylindrical sausage or wiener. Specifically, the ratio of surface areas for a flat square patty and a cylindrical product of equal mass is:

$$\frac{\text{Area Patty}}{\text{Area Cylinder}} = \frac{d}{2t}$$

where d is the diameter of the cylinder and t is the thickness of the flat patty. For example, a typical cylindrical hot dog is approximately one inch in diameter. A comparable weight flat patty 0.25 inch thick would have a surface area twice that of the cylinder as indicated by the above expression, i.e.:

$$\frac{\text{Area Patty}}{\text{Area Cylinder}} = \frac{1}{2 \times .25} = 2$$

This increased surface area to mass ratio in the flat patty results in an increase of the area exposed to surface treatment, in this case smoking. This provides the opportunity to impart a substantially different and improved flavor to the product. It also results in faster heat treating and cooking and a reduction in heat treating equipment size.

A certain amount of surface drying in conjunction with the smoke surface treatment is also preferred in order to develop the product attributes of hide, color, flavor and texture. As shown in FIG. 1, this surface drying may be accomplished in an impingement oven by jets of hot air 38 as is common in the food industry. A perforated metal belt could be used to allow simultaneous drying and smoke application from both sides of the patties. Alternatively, it is frequently preferable to treat one side of the patty on a first belt 39. This patty 32 is then transferred from the first belt 39 to a second belt 40, as shown in FIG. 1, while at the same time flipping the patty over to expose the second side to the liquid smoke 36 and the aggressive drying provided by the impinging air jets 38.

Drying of the patties typically may be performed in conjunction with final cooking. An additional final cook of the surface treated patties 42 is preferably accomplished in an oven 44 as shown in FIG. 1, and for example under high humidity. If desired, the patties 42 may be stacked several thick and steam cooked to provide better utilization of the cooking equipment.

Following final cooking of the product, the cooked patties 46 are chilled using equipment common to the industry, such as a spiral chiller/freezer or impingement tunnel 48. It also may be desirable to freeze the product for distribution to the end user.

A typical handling device 49 may then be employed to transport the chilled or frozen patties 50 to place them in stacks between interleaving layers of parchment paper (not shown) so they can be boxed for shipping. This permits easy separation by the end user, such as a quick service restaurant.

The principal advantage of the embodiment of the invention shown in FIG. 1 is that no rework or scrap is generated even though the patty shapes may be round or of a shape other than rectangular. However, this is probably with some sacrifice in accuracy or control of the final dimension due to inconsistencies in the patty formation process. Another potential disadvantage of this method is that in some cases the edges of the already shaped patties may crack or some distortion of the patty may take place during the final cook, because the patty shapes have been preformed prior to heat processing.

Figure 2:
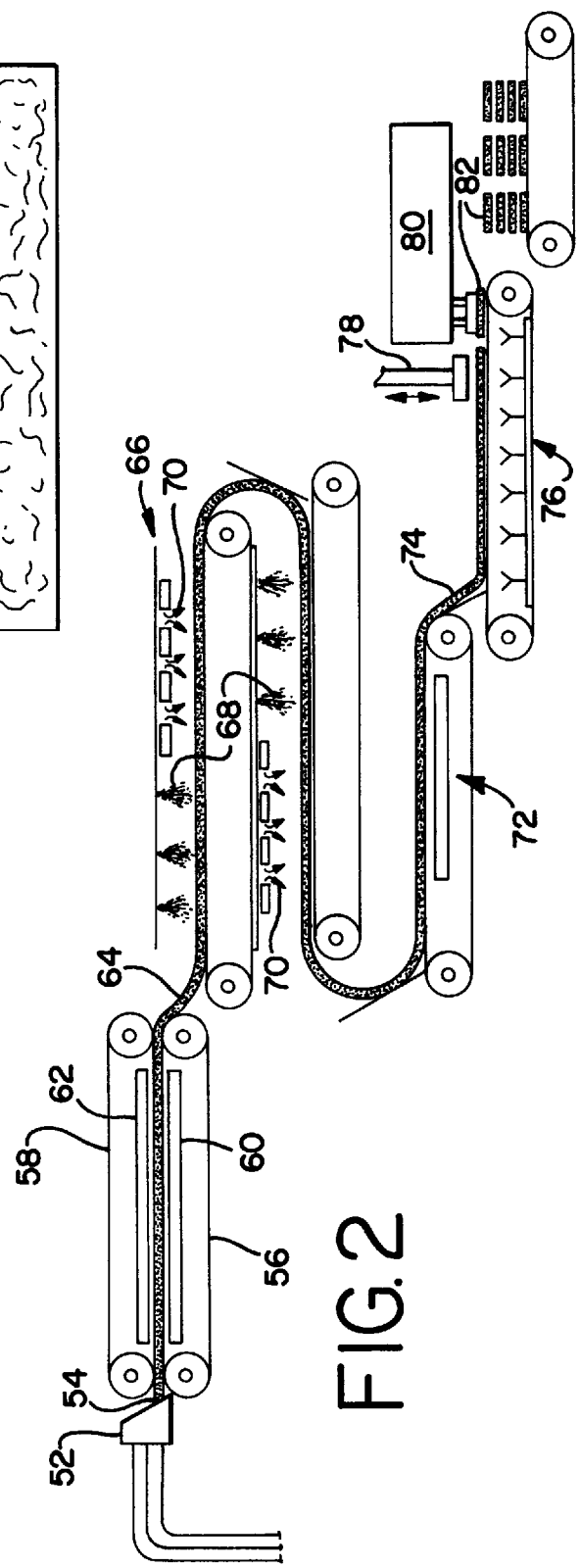
FIG. 2 is a schematic depiction illustrating a second preferred embodiment of method in accordance with the principles of the present invention.

A second preferred embodiment of invention is shown in FIG. 2 which may avoid some or all of the last mentioned potential disadvantages. In this process, the meat slurry or batter is pumped through an extrusion head 52 which is designed to deliver a sheet or ribbon 54 of slurry or batter under pressure to the surface of a continuously rotating endless belt 56 and so that the sheet or ribbon moves to the right as viewed in FIG. 2 between belt 56 and an upper belt 58. The sheet is squeezed between the belts 56 and 58 to its desired thickness, and the pressure applied to the sheet will produce the layered texture in cross-section as previously described.

Heating elements 60 and 62 are also provided within the belts 56 and 58 and on each side of the meat emulsion sheet 54. The temperature of the elements 60 and 62 is sufficiently high so that the proteins in the meat will be congealed to form a shape-stable sheet as previously described by the time the sheet is ready to leave belts 56 and 58. However, the temperature of the sheet is still low enough at this point so that there will not be any considerable breakdown or rendering of the meat or moisture loss from the sheet for the reasons previously discussed.

The congealed continuous sheet 64 is next transferred to equipment 66 for treating the surfaces of the sheet 64. This surface treating equipment 66 may be similar to the equipment 34 described in connection with FIG. 1. Smoke 68 is applied in natural or liquid form to both sides of the sheet 64, and drying is provided at 70 to give the desired attributes as previously described. In order to expose both surfaces of the sheet 64 to these treatments, alternating passes which flip the sheet over a minimum of at least one time, as shown in FIG. 2, and perhaps several times are provided.

Again, the drying and cooking may be accomplished within the same equipment. Alternatively, a separate cook oven 72 may be provided as shown in FIG. 2. The continuous sheet may be folded over into layers if desired in the cook oven.

Upon completion of the final cooking of the sheet, the cooked sheet 74 is chilled in a chiller 76 as previously described. Preferably following chilling, the final flat shapes are cut out of the chilled sheet by a die stamping device 78, as shown in FIG. 2. In the alternative, water jet cutters could be used to cut the shapes from the sheet.

A handling device 80 may then be employed to transport the cut patties 82 (either as chilled as shown in FIG. 2 or as frozen) for stacking and subsequent packaging in the manner previously described.

Rework generated in cutting the final shapes if any can be returned to the input raw material in reasonable amounts and in a manner common to the industry. The amount of rework in this method can be minimized or eliminated altogether by the proper selection of the geometric shape to be cut, such as a square or rectangle. There is no restriction on the dimensions of the finished product.

One advantage of the embodiment shown in FIG. 2 is that this method is quite amenable to on-line and continuous portion control. An industrially common non-contact thickness gauge can be used to continuously monitor the thickness of the meat ribbon or sheet. This information, in turn, can be feed back to control any of several parameters which determine final thickness of the meat, such as raw batter feed rate. Alternatively, portion control can be obtained with a water jet cutting system by measuring thickness, and automatically and continuously adjusting the size of the patty.

Another advantage of the embodiment shown in FIG. 2 is that the possibility of distortion of the patties or cracking of the edges due to cooking is essentially eliminated because the sheet mass rather than the discrete shapes are heat treated and cooked and the shapes are then cut from the sheet after cooking.

By way of example congelation times in seconds for meat emulsions in a continuous sheet form as shown in FIG. 2 and moving between two superimposed heating elements 60 and 62 as shown in FIG. 2 are compiled in Table 1.

TABLE 1

| Plate Temp., °F. | Sheet Thickness, in. | | | |
| --- | --- | --- | --- | --- |
| | 1/4 | 5/16 | 3/8 | 1/2 |
| 120 | 75–230 | 115–310 | 165–400 | 295–610 |
| 125 | 60–180 | 90–245 | 130–310 | 235–480 |
| 130 | 50–155 | 80–205 | 115–265 | 200–405 |
| 135 | 45–135 | 70–180 | 100–235 | 175–360 |
| 140 | 40–120 | 65–165 | 90–210 | 160–325 |
| 145 | 37–110 | 57–150 | 85–190 | 145–295 |
| 150 | 34–100 | 53–135 | 77–175 | 135–275 |

The values shown in Table 1 are for meat emulsions having an initial temperature of 40° F. The times listed in Table 1 is the time required to raise the core temperature of the continuous sheet from the initial temperature of 40° F. to a final temperature of 115° F. At the latter temperature, the sheet is essentially shape stable due to the congealing of the meat proteins. The short times in Table 1 correspond to the case in which there is negligible heat transfer resistance between the heating elements and the meat emulsion, such as where the sheet of meat is sandwiched between two heat conductive thin metal belts with sufficient pressure on the meat so that there is continuous intimate contact between the belt and the sheet of meat. The longer times correspond to the case in which the heat transfer resistance is substantially higher, such as where the belts are of a poorer heat conducting polymeric material.

The following example is set forth to illustrate the production of a substantially flat, all-beef wiener product produced in accordance with the principles of the present invention.

EXAMPLE

Approximately 10 pounds of an all-beef wiener emulsion batter is prepared from the following ingredients:

| Ingredient | Percentage |
| --- | --- |
| 50 Beef Trim | 47.3 |
| Water/Ice | 23.3 |
| 89 Beef Trim | 22.9 |
| Salt | 2.27 |
| Dry Corn Syrup | 1.84 |
| Dextrose | 1.20 |
| Ground Mustard | 0.83 |
| Yeast | 0.17 |
| Cure Mix | 0.10 |
| Spice | 0.052 |
| Sodium Erythorbate | 0.038 |

As is conventional in the meat industry, 50 Beef Trim is beef which has been trimmed to 50 wt % lean and 89 Beef Trim is beef which has been trimmed to 89 wt % lean. The cure mix is the conventional sodium nitrate and sodium chloride mixture for hot dog batters which, together with the sodium erythorbate, has the principal purpose of adjusting the color, cure, flavor and shelf life.

The raw meat ingredients are ground through a grinder plate which contains ⅛" diameter holes.

A slurry mix is prepared by adding the ground 89 beef trim and a portion of the 50 beef trim to a mixer. The salt, cure mix and sodium erythorbate are added to the mixer along with sufficient water and/or ice to achieve the optimum salt concentration in the mixture which will result in maximizing the extraction of salt soluble proteins from the animal muscle fibers. That amount is generally accepted in the industry as about 8 wt % salt. This slurry is mixed for a time sufficient to ensure that the extraction of the salt soluble contractile proteins is maximized and will depend on many factors, such as the size of the mixer, size of the batch, etc. as is well known to those in the art.

Following the preparation of the slurry mix, the remainder of the fat trimmings, water/ice and dry ingredients are added to the mixer. This is mixed until all ingredients are sufficiently blended to achieve chemical homogeneity.

Prior to use, the mixture is chopped and emulsified in a bowl chopper until a temperature change of about 25° F. has occurred in order to form the hot dog emulsion.

A press is used to form sheets of the foregoing meat emulsion and coagulate them. The press has a pair of plates, one fixed and one movable, similar to the press 16 shown in FIG. 1, but without the belt 24. The press plates are formed of aluminum and are water heated. This press is preheated to 135° F., and a convection oven is also preheated to 200° F.

The correct shims to use on the press to space the press plates from each other are determined based upon the desired thickness of the finished product. There is some shrinkage in the horizontal direction which results in an increase in thickness of the pressed sheet ⅟₁₆–⅛ inch during the final cooking step in the convection oven. In view of this the following shims are used for the desired finished thickness.

| Finished Thickness | Shim Thickness |
| --- | --- |
| 5/16 | ¼ |
| ⅜ | 5/16 |
| 7/16 | ⅜ |

About 2 pounds of batter is placed on the bottom plate of the preheated press between the shims and the press is immediately closed after the batter has been placed on the bottom plate. Otherwise the batter will start to congeal before the sheet is formed and wrinkles or creases will be formed in the final formed sheet.

The time in the press will depend primarily upon the thickness and the initial temperature of the batter. The following guidelines are given in this regard:

| Shim Thickness | Time in Press |
| --- | --- |
| ¼ | 1-½ min. |
| 5/16 | 2-¼ min. |
| ⅜ | 3 min. |

These times are adjusted from those above as necessary to insure that the sheet of meat emulsion is sufficiently congealed so that it can be folded and removed from the press in one continuous piece. If the sheet falls apart as the plates are opened or upon removal from the press, the time in the press should be increased. If too much rendering takes place so that there is an excessive amount of grease or cook-out, the time in press should be reduced. If excessive rendering is taking place and the sheet is not sufficiently congealed, the press temperature is too high and should be cooled down in increments and time lengths increased until a satisfactory temperature-time relationship is determined.

The best results are obtained if the temperature of the sheet measured at the center and several inches from the edge is about 115° F.

The shape stable sheets are then removed from the press and stacked on a tray. At this point the sheets are pliable and can be manipulated to some extent as necessary to fit into the trays.

The top surfaces of the sheets are then brushed with liquid smoke and the trays are inserted into the preheated convection oven. The time in the oven depends primarily on the thickness of the sheets with the following thicknesses and times set forth as guidelines:

| Shim Thickness | Time in Convection Oven, Each Side |
| --- | --- |
| ¼ | 5 min. |
| 5/16 | 6 min. |
| ⅜ | 7 min. |

After the designated time in the convection oven, the trays are removed and the sheets are flipped over. At this time any excess cook-out or moisture on the sheets is blotted off with a paper towel. The newly presented top surfaces are brushed with liquid smoke and the trays are again reinserted into the convection oven and the cooking time repeated.

At the end of the second cook in the convection oven, the temperature of the sheets is measured. A fine diameter probe is used for this purpose and the temperature is taken through the side of the sheets inserting the tip of the probe at least one inch in from the edge. The temperature should preferably be 160° F. or higher, and several measurements are taken with the decision to extend the cooking time being based on the lowest measured temperature.

After the cook has been completed and the sheets are removed from the oven, they are blotted dry and covered with a suitable protective material, such as Saran or aluminum foil. The covered sheets are allowed to cool by placing in a cooler or freezer.

Once they have cooled below room temperature, the sheets are cut into the final patty shapes using a template and a knife. In the alternative a die cutter can also be used.

The finished patties are then vacuum packaged, boxed, frozen and stored.

Figure 4:
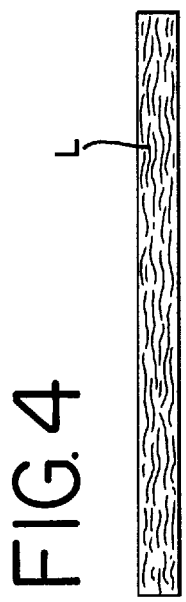
FIG. 4 is a cross-sectional elevation view of the meat product, as viewed substantially along line 4—4 of FIG. 3.

As depicted in FIGS. 3 and 4, the products made in accordance with the foregoing example exhibit a stratified layered appearance L in cross-section similar to a layered pastry, and a firm juicy bite through the meat fibers. The surface is semirough, flat and pleasantly pock marked in the nature of a hamburger, with shallow irregular creviced pocks P and the product has a pleasing pink color throughout.

It will be appreciated that the foregoing example has been set forth as illustrative of a manual procedure for preparing substantially flat meat products in accordance with the methods of the present invention and that the procedures and equipment described in the example may be varied without departing from the principles of the invention. It also will be understood that different meat ingredients, such as pork, chicken and turkey, can be used alone or in combination with one another in place of the all-beef hot dog batter described in the example.

After considering the foregoing, it will be appreciated that the present invention is capable of readily and efficiently producing a substantially flat meat product and, more particularly, a substantially flat wiener or hot dog which can be more advantageously cooked or reheated on a flat heating surface, which has a unique layered texture in cross-section and an attractive semi-rough, flat and pock marked surface, which has a firm bite and juicy mouthfeel, and in the case of a beef wiener, an attractive appetizing pink color. In the methods of the present invention, the product type and shape may be easily changed and the processing time may be substantially reduced relative to the cylindrical counterparts of the same product. The methods of the present invention are capable of being carried out with more compact and less capital intensive equipment and with a minimum or absence of rework or scrap. In the methods of the present invention the product may also be formed using conventional hot dog emulsified batters or other conventional sausage starting mixes.

It will also be appreciated that the meat products which may be formed by the methods of the present invention are formed without the use of casings which further reduces the cost and complexity of production, and that the methods of the present invention are capable of continuous production of meat product and continuous quality control monitoring of important product characteristics such as color and texture.

Finally, it will be understood that the preferred embodiments of the present invention which have been described are merely illustrative of the principles of the present invention. Numerous modifications may be made by those skilled in the art without departing from the true spirit and scope of the invention.

We claim:

1. A method of producing a substantially flat food product from a finely divided material containing substantial amounts of protein of an animal origin, comprising the steps of:
    forming the finely divided material prior to cooking into a flat form of a predetermined thickness;
    heating the flat form to a temperature and for a time sufficient to congeal a sufficient amount of the protein of animal origin on a surface of the flat form to form a thin skin to stabilize the flat form, but insufficient to cause any substantial rendering of the material;
    treating the thin skin surface of the congealed flat form to establish its texture and flavor; and
    cooking said treated flat form into said food product.

2. The method of claim 1, wherein the finely divided material which is formed into the flat form prior to cooking is an emulsified batter containing substantial amounts of the protein of animal origin therein.

3. The method of claim 2, wherein the protein is of a red meat or poultry origin.

4. The method of claim 3, wherein said protein is primarily beef.

5. The method of claim 1, wherein the protein is of a red meat or poultry origin.

6. The method of claim 5, wherein said protein is primarily beef.

7. The method of claim 1, wherein said flat form is a sheet, and said sheet is divided subsequent to said cooking into a plurality of pieces of flat discrete patty shapes.

8. The method of claim 1, wherein said flat form is a sheet, and said sheet is cooled subsequent to cooking and divided into a plurality of pieces of flat discrete patty shapes subsequent to said cooling.

9. The method of claim 1, wherein said flat form comprises a plurality of pieces of flat discrete patty shapes prior to said cooking.

10. The method of claim 1, wherein said forming into a flat form and heating occur simultaneously.

11. The method of claim 1, wherein said flat form is heated to about 115° F. to congeal the protein.

12. The method of claim 1, wherein said treating of the surface of the congealed flat form is by the drying of the surface, the application of a smoke formulation or both.

13. The method of claim 12, wherein said treating of the surface denatures the surface to form a hide thereon.

14. The method of claim 13, wherein said flat form has two surfaces opposite each other and both surfaces are treated.

15. The method of claim 12, wherein said flat form has two surfaces opposite each other and both surfaces are treated.

16. The method of claim 1, wherein said treating of the surface denatures the surface to form a hide thereon.

17. The method of claim 16, wherein said flat form has two surfaces opposite each other and both surfaces are treated.

18. The method of claim 1, wherein said flat form has two surfaces opposite each other and both surfaces are treated.

19. The method of claim 1, wherein said cooking is performed in an oven.

20. The method of claim 1, wherein said material is a hot dog emulsion.

21. The method of claim 3, wherein said forming into a flat form and heating occur simultaneously; said flat form is heated to at least about 115° F. to congeal the protein; and said treating of the surface of the congealed flat form is by the drying of the surface, the application of a smoke formulation or both to denature the surface to form a hide thereon.

22. The method of claim 21, wherein said protein is primarily beef.

23. The method of claim 21, wherein said material is a hot dog emulsion.

24. The method of claim 21, wherein said flat form is a sheet, and said sheet is divided subsequent to said cooking into a plurality of pieces of flat discrete patty shapes.

25. The method of claim 21, wherein said flat form is a sheet, and said sheet is cooled subsequent to cooking and divided into a plurality of pieces of flat discrete patty shapes subsequent to said cooling.

26. The method of claim 21, wherein said flat form comprises a plurality of pieces of flat discrete patty shapes prior to said cooking.

27. The method of claim 1, wherein said forming into a flat form is accomplished by pressing or extruding the uncooked material prior to cooking.

28. The method of claim 1, wherein said cooked food product is at least about ¼ inch thick.

29. The method of claim 3, wherein said cooked food product is at least about ¼ inch thick.

30. The method of claim 13, wherein said cooked food product is at least about ¼ inch thick.

31. The method of claim 1, wherein the flat form is subjected to a pressure while heating to form the thin skin.

32. The method of claim 3, wherein the flat form is subjected to a pressure while heating to form the thin skin.

33. The method of claim 13, wherein the flat form is subjected to a pressure while heating to form the thin skin.

34. A method of producing a substantially flat food product from a finely divided emulsified batter material containing substantial amounts of protein of a red meat or poultry origin, comprising the steps of:

forming the finely divided material prior to cooking into a flat form of a predetermined thickness while simultaneously heating the flat form to at least about 115° F. to congeal a sufficient amount of the protein to stabilize the flat form, but insufficient to cause any substantial rendering of the material;

treating the surface of the congealed flat form to establish its texture and flavor by the drying of the surface, the application of a smoke formulation or both to denature the surface to form a hide thereon; and cooking said treated flat form into said food product.

35. The method of claim 34, wherein said protein is primarily beef.

36. The method of claim 34, wherein said protein is a hot dog emulsion.

37. The method of claim 34, wherein said flat form is a sheet, and said sheet is divided subsequent to said cooking into a plurality of pieces of flat discrete patty shapes.

38. The method of claim 34, wherein said flat form is a sheet, and said sheet is cooled subsequent to cooking and divided into a plurality of pieces of flat discrete patty shapes subsequent to said cooling.

39. The method of claim 34, wherein said flat form comprises a plurality of pieces of flat discrete patty shapes prior to said cooking.

40. The method of claim 34, wherein said cooked food product is at least about ¼ inch thick.

41. The method of claim 34, wherein the flat form is subjected to a pressure while heating to form a thin skin.

\* \* \* \* \*

UNITED STATES PATENT AND TRADEMARK OFFICE
CERTIFICATE OF CORRECTION

PATENT NO. : 5,811,146
DATED : September 22, 1998
INVENTOR(S) : Jerome F. Marra and Vernon D. Karman It is certified that error appears in the above-identified patent and that said Letters Patent is hereby corrected as shown below:

Title page,
References Cited, in Patent No. 4,163,804 change "Meter et al" to -- Meyer et al --.

Signed and Sealed this

Sixth Day of November, 2001

Attest:

NICHOLAS P. GODICI
Attesting Officer    Acting Director of the United States Patent and Trademark Office